US005432210A

United States Patent [19]

Bogan, Jr.

[11] Patent Number: 5,432,210
[45] Date of Patent: Jul. 11, 1995

[54] POLYMER PARTICLES AND METHOD FOR PREPARING BY POLYMERIZATION OF ENCAPSULATED MONOMERS

[75] Inventor: Leonard E. Bogan, Jr., Hatfield, Pa.

[73] Assignee: Rohm and Haas Company, Philadelphia, Pa.

[21] Appl. No.: 156,346

[22] Filed: Nov. 22, 1993

[51] Int. Cl.[6] ............ C08K 9/10; C08F 2/20; C08L 33/08; C08L 33/20
[52] U.S. Cl. .................. 523/201; 524/458; 524/460; 524/461; 524/539; 525/54.1; 525/291; 525/902
[58] Field of Search ............ 523/201; 524/457, 458, 524/459, 460, 461, 539; 525/54.1, 291, 902

[56] References Cited

U.S. PATENT DOCUMENTS

| | | | |
|---|---|---|---|
| 4,224,415 | 9/1980 | Meitzner et al. | 521/38 |
| 4,226,747 | 10/1980 | Roncari | 523/201 |
| 4,590,236 | 5/1986 | Konig et al. | 524/560 |
| 4,829,101 | 5/1989 | Kraemer et al | 523/201 |
| 5,190,994 | 3/1993 | Boter et al. | 523/201 |

OTHER PUBLICATIONS

Journal of American Chemical Society, K. S. Suslick, et al., vol. 112, No. 21, 1990, pp. 7807–7809.
Polymer Preparation, M. W. Grinstaff, et al., vol. 32(1), pp. 255–256.
American Chemical Society Symp. Ser. 493, M. W. Grinstaff, et al., (Macromol. Assem. Polym. Syst) pp. 218–226, 1992.
Journal of Microencapsulation, J. K. Lalla, et al., 1991, vol. 8, No. 1, pp. 37–52.
Proc. National Academy of Science USA, M. W. Grinstaff, et al., vol. 88, pp. 7708–7710, Sep. 1991.
Journal of Nuclear Medicine, U. Scheffel, et al., vol. 13, No. 7, pp. 498–503.
Journal of Microencapsulation, S. K. Pande, et al., vol. 8, No. 1, pp. 9–19, 1991.
Journal of Pharmaceutical Sciences, M. C. Levy, et al., vol. 80, No. 6, pp. 578–585, Jun. 1991.
Journal of Microencapsulations, J. K. Lalla, et al., vol. No. 1, pp. 37–52, 1991.
Journal of Pharmaceutical Sciences, M. I. Blake, et al., vol. 63, No. 10, pp. 1646–1647, Oct. 1974.
Journal of Ultrasound in Medicine, Keller et al., No. 5, pp. 493–498, Sep. 1986.
Journal of Microencapsulation, S. Pande, et al., vol. 8, No. 1, pp. 87–93, 1991.

*Primary Examiner*—Peter A. Szekely
*Attorney, Agent, or Firm*—David T. Banchik

[57] ABSTRACT

A method for preparing polymer particles having diameters within the range from less than 0.1 micron to about 200 microns is described. The method involves encapsulating at least one water insoluble monomer within a water soluble polymer containing at least one thiol functional group. This is accomplished by combining an organic phase containing the monomers and a free radical source with an aqueous phase containing the polymer to form a two phase mixture, and subjecting the two phase mixture to agitation or ultrasonic irradiation. This invention allows for the preparation of polymer particles with sizes not available by conventional suspension or emulsion polymerization methods. It also provides for polymer particles within the specifed size range having compositions not readily obtained by other polymerization methods. The polymer particles made by this method have an exterior portion of water soluble polymer bound to an interior polymer. The exterior polymer, when it is a condensation polymer such as for example a protein, may be removed by acid hydrolysis.

15 Claims, No Drawings

POLYMER PARTICLES AND METHOD FOR PREPARING BY POLYMERIZATION OF ENCAPSULATED MONOMERS

This invention relates to polymer particles and a method for preparing polymer particles within the size range of from about 0.1 micron to about 200 microns. The polymer particles contain an exterior polymer and an interior polymer, the exterior polymer being bound to the interior polymer. More particularly, the invention relates to a method for preparing such polymer particles by encapsulating at least one water insoluble monomer within a water soluble polymer, the water soluble polymer having a thiol group, to form a dispersion, and polymerizing the monomer or monomers. In some cases the encapsulating polymer may be removed by acid hydrolysis to form an aqueous dispersion of new polymer particles.

The particle sizes of polymers that may be produced using known polymerization methods are limited. Emulsion polymerization is useful for preparing polymer particles in the size range from about 0.05 micron to about 1 micron. Particles of sizes greater than 1 micron are not readily prepared by conventional emulsion polymerization because the emulsion polymerization process leads preferentially to the formation of separate smaller polymer particles rather than the growth of existing polymer particles. Control of particle size is also lost when attempts are made to form particles larger than 1 micron by emulsion polymerization.

Suspension polymerization is another technique known in the art for preparation of polymer particles. Suspension polymerization produces polymer particles within the size range of from 200 microns to several millimeters. In conventional suspension polymerization, the polymer particles are generated by shearing large monomer droplets through stirring, and are stabilized by a colloidal suspension agent. There is no commercially viable suspension polymerization method for preparing polymer particles with sizes less than 200 microns, because although small polymer particles may be generated by high shear mixing, the particle size cannot be controlled under such conditions and the polymer particles cannot be stabilized by the suspension agent used in the polymerization process.

The present invention seeks to overcome these limitations in polymer particle size by using a novel suspension polymerization process to prepare polymer particles in the particle size range of between about 0.1 micron to about 200 microns. A critical aspect of the process is the means by which the water insoluble monomers and the resulting polymer particles are stabilized. The stabilization is accomplished by encapsulating the water insoluble monomer or monomers within a water soluble polymer in an aqueous dispersion. These particles are useful in applications such as for example chromatography and catalysis, and as toner resins and adsorbents.

According to a first aspect of this invention there is provided a polymer particle having an exterior polymer and an interior polymer, wherein said interior polymer is encapsulated within and bound to the exterior polymer by one or more sulfide linkages, and wherein the polymer particle has a diameter in the range of from about 0.1 micron to about 200 microns.

In a second aspect of this invention there is provided a method for preparing a polymer particle having a diameter in the range of from about 0.1 micron to about 200 microns by forming an aqueous dispersion by encapsulating at least one water insoluble monomer and at least one free radical source within a water soluble polymer comprising one or more thiol functional groups, said water soluble polymer being dissolved in an aqueous phase, and polymerizing the at least one water insoluble monomer within the water soluble polymer to form said polymer particle.

Another aspect of this invention utilizes ultrasonic irradiation or mechanical mixing to encapsulate the water insoluble monomer or monomers within the water soluble polymer.

Another aspect of this invention utilizes a surfactant as an additional stabilizing agent for the water insoluble monomer or monomers within the aqueous dispersion.

A further aspect of this invention is the formation of a new polymer particle having the specified particle size range and formed from the interior polymer by the removal of the exterior polymer.

Still another aspect of this invention provides for the modification to the polymer particles of the invention by the addition of a disulfide cleavage reagent to the polymer product.

The polymerization process of this invention starts with an organic phase which contains at least one water insoluble monomer and at least one free radical source, and an aqueous phase which contains a water soluble polymer having at least one thiol group. The organic phase and the aqueous phase are combined to form a two phase mixture. From the mixture is formed a stable dispersion which allows polymer particles of the desired size range to be formed and stabilized.

Any water soluble polymer which contains at least one thiol functional group is useful for encapsulation of the water insoluble monomers. It is preferable that the polymer contain more than one thiol group for efficient encapsulation. Polymers which may be used include naturally occurring proteins which contain thiol groups such as for example serum albumin and gamma globulins. Synthetic polymers that are useful for encapsulating the monomers include for example acrylic and methacrylic polymers which contain a thiol group.

Water insoluble monomers useful in this invention include monoethylenically and polyethylenically unsaturated monomers such as styrene, vinyl toluene, vinyl naphthalene, non-aromatic vinyl monomers such as acrylonitrile, $C_1$–$C_{18}$ acrylates and methacrylates, vinyl acetate and other vinyl esters, vinyl ethers, vinyl chloride, vinylidene chloride, butadiene, divinyl benzene vinyl dicarboxylic acids and ethylene.

It is preferable to include a polyethylenically unsaturated monomer such as for example divinyl benzene in the organic phase when polymerizing a monoethylenically unsaturated monomer. While polymerization may be achieved without the presence of a polyethylenically unsaturated monomer, its use is preferable in certain cases to prevent agglomeration of the individual polymer particles.

The weight ratio of the water soluble polymer to the starting organic phase may range from 0.001:1.0 to 1.0:1.0, preferably from about 0.01:1.0 to 0.4:1.0. It is possible to achieve successful encapsulation and polymerization with a ratio of polymer to organic phase as low as 0.001:1.0 if a surfactant is added. Surfactants for use in this method include for example sodium dodecylbenzene sulfonate. In the absence of a surfactant, agglomeration of the particles may occur when the ratio of polymer to organic phase is less than 0.01. The weight ratio of encapsulating polymer to organic phase does not affect the particle size of the polymer.

The particle size of the polymer resulting from the polymerization method of this invention may be controlled by several factors. These include the type and rate of agitation, the composition of the water soluble polymer, the composition of the water insoluble monomers, the pH of the aqueous phase, and the overall composition of the organic phase which may include a solvent for the monomers.

For a given monomer or monomers, starting with a different water soluble polymer while maintaining other process parameters the same will change the particle size of the polymer that is formed from the water insoluble monomers. For example, polymer particles with average diameters in the range of 2 microns to 4 microns are formed when a monomer mixture of styrene and divinyl benzene is polymerized with bovine serum albumin or gamma globulin as the encapsulating polymer. The same monomer mixture forms polymer particles with average diameters of less than 1 micron with an acrylic encapsulating polymer.

To effect the encapsulation of the monomer or monomers, the mixture of the organic phase and the aqueous phase may be subjected to mechanical agitation, or to ultrasound waves. Subjecting the two phase mixture to ultrasound waves is herein referred to as to "sonicate" or "sonication". Sonication or agitation is carried out long enough to form a stable dispersion. The formation of a stable dispersion is indicated by a change in appearance of the mixture from transparent to milky white. The presence of oxygen is necessary in order for the encapsulation to be effective. The water soluble polymer with the water insoluble monomer or monomers enclosed is referred to as a "microcapsule".

When sonication is to be used for encapsulation, irradiation may be accomplished by means of an ultrasonic probe placed into the mixture. A sonicator operating within a frequency range of about 8 kHz to about 40 kHz may be employed. The time required to form the dispersion by use of sonication, may range from several seconds to several minutes, usually from about 5 seconds to about 60 seconds.

When mechanical mixing is used for agitation, a faster rate of agitation reduces the particle size because the shear rate increases with speed of agitation. Mechanical agitation of the two phase mixture to form the dispersion may be accomplished by several methods. One method of mechanical agitation is by use of a paddle stirrer.

Depending upon the monomers being used and the particle size desired for the polymer, the stirring rates may range from about 20 to about 2000 rpm. When mechanical agitation of the mixture is by means of a paddle stirrer, the use of a hydroxyl radical generating species is required. Chemical means such as for example an initiator may be used to generate hydroxyl radicals. The initiator may be part of a redox initiator system which includes the initiator and an oxidation reduction pair such as for example iron sulfate and isoascorbic acid.

Another method for mechanical agitation of the mixture is by use of a high shear laboratory mixer, also known as a homogenizer. Use of a homogenizer typically requires an agitation time from several seconds to several minutes. Using a paddle stirrer for agitation results in a larger polymer particle size than is obtained with a homogenizer. The polymer particle size obtained with a homogenizer is larger than the particle size obtained with sonication and is affected by the speed of the homogenizer. A homogenizer used at a fast rate may produce particles of a size close to that obtained with a sonicator.

When a protein is used as the water soluble polymer for encapsulation, the pH affects the resulting particle size. With bovine serum albumin as the encapsulating polymer, lower pH favors larger particles and a broader particle size distribution. This is illustrated herein below in examples 4 and 5. A monomer mixture of styrene and divinyl benzene formed particles with an average diameter of 2 to 4 microns at a pH of 10, and the same mixture formed particles with diameters ranging from 2 to 10 microns at a pH of 4 to 5.

The particle size of the polymer formed by this method is also affected by the composition of the organic phase. The organic phase contains the monomer or monomers for polymerization, at least one free radical source, and optionally a solvent. For a given solvent, the particle size of the resulting polymer will depend upon the composition of the monomer or monomers. For example, with methyl isobutyl ketone as a solvent, changing the monomer from a styrene divinyl benzene mixture to trimethylolpentane trimethacrylate changes the average particle size of the polymer from between 2 microns and 4 microns to less than 1 micron. Detailed examples are provided herein below.

Besides affecting the polymer particle size, the use of a solvent in the organic phase will also affect the morphology of the polymer particle that is obtained from this method. Use of a compound which is a solvent for the monomer or monomers but not for the polymer which is formed when they are polymerized, will result in formation of a macroreticular polymer particle. (U.S. Pat. No. 4,224,415). Such polymer particles are permeated by small channels, resulting in a porous structure.

The temperature at which the two phase mixture or the stable dispersion formed from the mixture is maintained prior to polymerization is in the range of from about 1° C. to about 99° C., preferably from about 1° C. to about 40° C., and most preferably about room temperature. The lower temperature limit is determined by the requirement that the mixture and aqueous dispersion must remain liquid. As temperatures are raised above about 60° C. polymerization of the monomers may occur. This is not desirable before sufficient encapsulation has occurred.

Following formation of the aqueous dispersion of the microcapsules containing the monomer or monomers, the monomers are polymerized. The polymerization may be accomplished by heating the aqueous dispersion. The time and temperature required for heating depends upon the monomer or monomers and the free radical source being used.

Addition of a disulfide cleavage reagent alter the polymerization is complete will allow the exterior polymer to remain attached to the interior polymer but it will no longer be in the form of a microcapsule. Disulfide cleavage reagents include compounds such as thiols, and cyclic dithiols such as for example dithiothreitol.

For some applications, it may be desirable to utilize the particles as they are formed from the polymerization. The particles will have the encapsulating water soluble polymer on the exterior and the encapsulated polymer formed from the water insoluble monomers on the interior.

The ability to have the exterior polymer remain attached to the interior polymer particle allows for the formation of selectively functionalized polymer particles by using functionalized water soluble polymers for the encapsulation. This capability may be useful in applications such as for example biological or biomedical separations. For example, current processes exist for attaching antigens to polymer particles following polymerization of monomers which contain an epoxy functionality. The method of this invention permits the attachment of proteins containing selected functional groups during the polymerization of the encapsulated monomers.

A new polymer particle having a size within the specified range may be formed by the removal of the exterior polymer from the interior polymer. If the water soluble polymer is a condensation type polymer, such as for example a protein, it may be removed from the interior polymer by acid hydrolysis. This is accomplished by adding to the polymer particles a concentrated solution of acid such as for example hydrochloric acid after the polymerization is complete. The concentration of the acid used is within the range from about 1 Normal (N) to about 12N. Hydrolysis may be accomplished by refluxing the acidic solution containing the polymers for a time within the range of about 4 hours to about 4 days.

EXAMPLES

Example 1

Microcapsule stabilization utilizing bovine serum albumin as water soluble polymer. Weight ratio of water soluble polymer to organic phase is 0.67

In 196.0 g deionized water, 4.0 grams (g) bovine albumin were dissolved. A mixture was made of 3.13 g styrene, 1.34 g 50% divinylbenzene, 1.49 g methyl-isobutyl ketone, and 0.045 g t-butyl peroctoate, which were combined and shaken to dissolve, and added to the aqueous albumin solution. The mixture was sonicated for 3 minutes with half of the reaction vessel immersed in a water bath at 23° C. After 30 seconds of sonication the mixture had turned completely white and opaque. The dispersion was transferred with about 10 g deionized water to a 500 mL four-necked round bottomed flask, where it was heated under nitrogen at 60° C. for one hour, at 85° C. for two hours, and finally at 70° C. for 20 hours. The product polymer particles had an average diameter of about 2 microns, observed by optical microscopy.

Example 2

Microcapsule stabilization utilizing bovine serum albumin as water soluble polymer. Weight ratio of water soluble polymer to organic phase is 0.01.

In 187.875 g deionized water, 0.125 g bovine albumin was dissolved. A mixture was made of 6.26 g styrene, 2.68 g 50% divinylbenzene, 2.98 g methyl-isobutyl ketone, and 0.089 g t-butyl peroctoate, which were combined and shaken to dissolve, and added to the aqueous albumin. The mixture was sonicated for 3 minutes with half of the reaction vessel immersed in water bath at 23° C. Almost of the clear, colorless liquid turned opaque and white immediately, but after 3 minutes of sonication, only 5.5 g of the organic phase was dispersed. The dispersion was transferred with about 10 g deionized water to a 500 mL four-necked round bottomed flask, where it was heated under nitrogen at 80° C. for 6 hours. The product polymer particles had an average diameter of about 2 microns, observed by optical microscopy.

Example 3

Microcapsule stabilization utilizing bovine serum albumin as water soluble polymer. Weight ratio of water soluble polymer to organic phase is 0.42

In 187.5 g deionized water, 0.5 g bovine albumin was dissolved. A mixture was made of 6.26 g styrene, 2.68 g 50% divinylbenzene, 2.98 g methyl-isobutyl ketone, and 0.089 g t-butyl peroctoate, which were combined and shaken to dissolve, and added to the aqueous albumin. The mixture was sonicated for 3 minutes with half of the reaction vessel immersed in 2 L of stirred water at room temperature (20° C.). The temperature rose from 19.8° C. to 25.5° C. during sonication. After 30 seconds of sonication, the clear, colorless liquid had turned completely opaque and white. The dispersion was transferred with about 10 g deionized water to a 500 mL four-necked round bottomed flask, where it was heated under nitrogen with stirring over a period of 1 hour to 60° C. and held at that temperature for one hour, then heated over a period of 2 hours to 85° C. and held for 2 hours. The product was allowed to cool to 70° C. and held for 16 hours. The product polymer particles had an average diameter of 2–4 microns, observed by scanning electron microscopy.

Example 4

Microcapsule stabilization at high pH.

In 187.5 g deionized water, 0.5 g bovine albumin was dissolved and two drops of a 50% aqueous solution of NaOH were added. The measured pH was 10.0. A mixture was made of 6.26 g styrene, 2.68 g 50% divinylbenzene, 2.98 g methyl-isobutyl ketone, and 0.089 g t-butyl peroctoate, which were combined and shaken to dissolve, and added to the aqueous albumin. The resulting weight ratio of albumin to organic phase was 0.042. The mixture was sonicated 3 minutes within half of the reaction vessel immersed in 2 L of stirred water at room temperature (21° C.). Almost immediately the clear, colorless liquid had turned completely opaque and white. During this process, the temperature of the reaction mixture rose to 26° C. The dispersion was transferred with about 10 g deionized water to a 500 mL four-necked round bottomed flask, where it was heated over 30 minutes to 60° C. and held 120 min., then heated over a period of 60 minutes to 70° C. and held for 18 hours. The stirring rate was kept moderate. The product polymer particles had an average diameter of 2–4 microns, observed by scanning electron microscopy.

Example 5

Microcapsule stabilization at low pH.

In 374 g deionized water, 2.0 g bovine albumin were dissolved and the pH was adjusted to about 4–5 with concentrated aqueous HCl. A mixture was made of 6.26 g styrene, 2.68 g 50% divinylbenzene, 2.98 g methyl-isobutyl ketone, and 0.089 g t-butyl peroctoate, which were combined, shaken to dissolve, and added to the aqueous albumin. The resulting weight ratio of albumin to organic phase was 0.042. The mixture was sonicated for 2 minutes at room temperature (21° C.). Almost immediately the clear, colorless liquid had turned completely opaque and white. During this process, the temperature of the reaction mixture rose to 26° C. The dispersion was transferred with about 10 g deionized water to a 500 mL four-necked round bottomed flask, where it was heated over 60 minutes to 60° C. and held for 120 minutes; heated over a period of 60 min. to 80° C. and held for 120 minutes, then cooled to 70° C. and held for 18 hours. The stirring rate was kept moderate. The product polymer particles had average diameters in the range of from 2 to 10 microns observed by scanning electron microscopy.

Example 6

Microcapsule stabilization of acrylic mortomers.

In 187.5 g deionized water, 0.5 g bovine albumin was dissolved. A mixture was made of 7.36 g trimethylolpentanetrimethacrylate, 4.56 g methyl-iso-butyl ketone, and 0.074 g t-butyl peroctoate, which were combined, shaken to dissolve, and added to the aqueous albumin. The mixture was sonicated for 3 minutes with half of the reaction vessel immersed in 2 L of stirred water at room temperature (20° C.). After 30 seconds of sonication, most of the clear, colorless liquid had turned opaque and white. The dispersion was transferred with about 10 g deionized water to a 500 mL four-necked round bottomed flask, where it was heated under nitrogen with stirring to 80° C. over a period of 2 hours, allowed to cool to 70° C. and held for 64 hours. The product polymer particles had an average diameter of less than 1 micron, observed by scanning electron microscopy.

Example 7

Microcapsule stabilization utilizing gamma globulins.

In 187.0 g deionized water, 1.0 g bovine gamma-globulins was dissolved. The pH was adjusted to 11-12 with 50% aq.NaOH. A mixture was made of 6.26 g styrene, 2.68 g 50% divinylbenzene, 2.98 g methyl-isobutyl ketone, and 0.089 g t-butyl peroctoate, which were combined, shaken to dissolve, and added to aqueous albumin. The resulting weight ratio of protein to organic: phase was 0.084. Sonicated 3 minutes with half of the reaction vessel immersed in 2 L of stirred water at room temperature (21° C.). Almost immediately the clear, colorless liquid had turned completely opaque and white. During this process, the temperature of the reaction mixture rose to 34° C. The dispersion was transferred with ca. 10 g deionized water to a 500 mL four-necked round bottomed flask, where it was heated over 30 minutes to 60° and held 120 min., then heated over a period of 60 min. to 70° C. and held for 48 hours. The stir rate was kept moderate. Cooled to 21° C. The product polymer particles had an average diameter of about 3 microns, with a narrower size distribution than for particles prepared using albumin for encapsulation, as observed by scanning electron microscopy.

Example 8

Acrylic polymer as encapsulating polymer.

In 185 g deionized water, 3.0 g acrylic polymer (50.6% latent thiol methacrylate, 19% methacrylic acid (MAA), 8.9% styrene, 8.9% hydroxyl ethyl acrylate, 7.6% butyl methacrylate, 5% methyl-3-mercaptopropionate) were dissolved. The pH was adjusted to 8.6. A mixture was made of 6.26 g styrene, 2.68 g 50% divinylbenzene, 2.98 g methyl-isobutyl ketone, and 0.089 g t-butyl peroctoate, which were combined, shaken to dissolve, and added to the aqueous acrylic. The resulting weight ratio of acrylic polymer to organic phase was 0.25. The mixture was sonicated for 1 minute at room temperature (20° C.). After 30 seconds of sonication, the clear, colorless liquid had turned completely opaque and white. The dispersion was transferred with about 10 g deionized water to a 500 mL four-necked round bottomed flask, where it was heated under nitrogen with stirring over a period of 19 hours at 70° C. The product polymer particles had an average diameter of 2-4 microns, observed by scanning electron microscopy.

Example 9

Acrylic polymer as encapsulating polymer.

In 186.5 g deionized water, 1.0 g acrylic polymer (36.8 MAA/34.9 styrene/20.2 latent thiol methacrylate/8.1 methyl-3-mercaptopropionate) was dissolved. The pH was adjusted to about 9-10. A mixture was made of 6.26 g styrene, 2.68 g 50% divinylbenzene, 2.98 g methyl-isobutyl ketone, and 0.089 g t-butyl peroctoate, which were combined, shaken to dissolve, and added to the aqueous acrylic. The resulting weight ratio of acrylic polymer to organic phase was 0.084. The mixture was sonicated for 3 minutes at room temperature (20° C.). After 30 seconds of sonication, the clear, colorless liquid had turned completely opaque and white. The dispersion was transferred with about 10 g deionized water to a 500 mL four-necked round bottomed flask, where it was heated under nitrogen with stirring over a period of 2 hours to 85° C. and held at that temperature for an additional 2 hours. The mixture was cooled to 70° C. and held at that temperature for 16 hours before cooling. The product polymer particles had an average diameter of less than 1 micron, observed by scanning electron microscopy.

Example 10

Homogenizer at fast speed.

In 187.5 g deionized water, 0.5 g bovine serum albumin was dissolved. A mixture was made of 6.26 g styrene, 2.68 g 50% divinylbenzene, 2.98 g methyl-isobutyl ketone, and 0.089 g t-butyl peroctoate, which were combined, shaken to dissolve, and added to the aqueous albumin. The mixture was agitated for two minutes using a homogenizer (Ultra-Turrax T25 drive, S 25N dispersing tool, maximum speed). The clear, colorless liquid turned opaque and white during this treatment. The dispersion was transferred with about 10 g deionized water to a 500 mL four-necked round bottomed flask, where it was heated under nitrogen with stirring over a period of 1 hour to 60° C. and held for one hour, then heated over a period of 2 hours to 85° C. and held for 2 hours. The mixture was allowed to cool to 70° C. and held at that temperature for 16 hours. The product polymer particles had an average diameter of 3 microns, observed by scanning electron microscopy.

Example 11

Homogenizer at slow speed.

In 187.5 g deionized water 0.5 g bovine albumin was dissolved. A mixture was made of 6.26 g styrene, 2.68 g 50% divinylbenzene, 2.98 g methyl-isobutyl ketone, and 0.089 g t-butyl peroctoate, which were combined, shaken to dissolve, and added to the aqueous albumin. The mixture was agitated for two minutes with a biohomogenizer at slow speed. The clear, colorless liquid turned opaque and white during this treatment. The dispersion was transferred with about 10 g. deionized water to a 500 mL four-necked round bottomed flask, where it was heated under nitrogen with stirring over a period of 1 hour to 60° C. and held for one hour, then heated over a period of 2 hours to 85° C. and held for 2 hours. The mixture was allowed to cool to 70° C. and held for 16 hours. The product polymer particles had an average diameter of 16 microns, observed by scanning electron microscopy.

Example 12

Paddle stirrer and chemical source of hydroxyl radicals used for encapsulation.

In 178.5 g deionized water, 0.5 g bovine albumin was dissolved and stirred in a 500 mL four-necked round bottomed flask. A mixture was made of 6.26 g styrene, 2.68 g 50% divinylbenzene, 2.98 g methyl-isobutyl ketone, 0.43 g 90% aqueous t-butylhydroperoxide, and 0.089 g t-butyl peroctoate, which were combined, shaken to dissolve, and added to the aqueous albumin. A solution was made of 0.77 g iso-ascorbic acid (4 mmol) in 4.2 g water and the solution was added with the organic phase to the stirred aqueous phase. Aqueous $FeSO_4$ (4.0 g of 0.15% by weight) was added and the mixture was stirred for one hour at room temperature, then for six hours at 70° C. The product polymer particles had an average diameter of >200 microns, observed by optical microscopy.

Example 13

Homogenizer at slow speed and chemical source of hydroxyl radicals used for encapsulation.

In 533.2 g deionized water, 1.5 g bovine serum albumin was dissolved. A mixture was made of 21.1 g 80% divinylbenzene, 14.7 g toluene, 0.186 g 90% aqueous t-butylhydroperoxide, and 0.167 g t-butyl peroctoate, which were combined and shaken to dissolve. A solution was made of 2.31 g iso-ascorbic acid in 15 g water and added with the organic phase to the stirred aqueous phase. $FeSO_4$ $(aq)$ (2.0 g of a 0.15% solution by weight) was added and the mixture was agitated for one minute with a homogenizer (Ultra-Turrax T25 drive, S 25N dispersing tool, maximum speed). The clear, colorless liquid turned opaque and white during this treatment. The dispersion was transferred with about 10 g deionized water to a 1 L four-necked round bottomed flask, where it was heated under nitrogen with stirring over a period of 1 hour to 70° C. and held 6 hours, then cooled to room temperature. Water and toluene were distilled from the mixture until only one phase was collected (about 120 mL total). The product polymer particles had an average diameter of 15–45 microns, observed by scanning electron microscopy.

Example 14

Poly (divinyl benzene) polymerized; exterior polymer removed following polymerization.

In 3554.5 g deionized water, 10.0 g bovine serum albumin were dissolved. A solution of 72.0 g 80% divinyl benzene, 168.0 g toluene, and 0.64 g tBPO was added. The mixture was homogenized for 1 minute at 8000 rpm (Ultra-Turrax T25 drive, S 25N dispersing tool). The layers were then allowed to separate. The upper layer was combined with 400 g deionized water and heated to 70° C. over 40 minutes. The mixture was maintained at 70° overnight, then cooled. Aqueous HCl (500 g concentrated) was added and the mixture was then heated to 90° C., and held at 90° overnight. The temperature was raised to 98° C. for one day, then to 107° C. for one day. The mixture was cooled and filtered, and the solid washed five times with deionized water, then washed with a 50% solution of methanol in water, and then washed with water until the wash was no longer acidic. A final wash was done with methanol. Yield after drying was 68.3 g white beads. Product polymer particle sizes were about 22 to 80 microns as determined by scanning electron microscopy.

Example 15

Acrylic monomers polymerized; exterior polymer removed following polymerization.

In 1316 g deionized water, 3.5 g bovine serum albumin were dissolved. A solution of 31.92 g trimethylol pentane trimethacrylate (TMPTMA), 52.08 g methyl-isobutyl ketone, and 0.329 g tBPO was stirred in. The mixture was sonicated for 75 seconds, then heated to 70° C. over 75 minutes. The dispersion which formed was maintained at 70° overnight. The dispersion was then cooled to 60° C. and 250 g methanol and 200 g acetone were added. After stirring 15 minutes, the dispersion was cooled to room temperature. The layers were allowed to separate, then the upper layer was combined with 86 g 6N $HCl_{(aq)}$. The upper layer was heated to 95° C., and held at 95° for nine days. The mixture was cooled and filtered, and the solid washed with deionized water until the wash was no longer acidic. Yield after drying was 7.15 g white beads. Product polymer particle sizes were about 0.5 to 5.0 microns as determined by scanning electron microscopy.

Example 16

Poly (styrene-divinyl benzene) polymerized utilizing bovine serum albumin and surfactant for encapsulation; exterior polymer removed following polymerization.

In 2314 g deionized water, 0.65 g bovine serum albumin was dissolved. A solution of 91.91 g 55% divinyl benzene, 10.79 g styrene, 52 g methyl isobutyl carbinol (MIBC), and 1.274 g tBPO was stirred in. The mixture was homogenized for 75 seconds at 8000 rpm (Ultra-Turrax T25 drive, S 25N dispersing tool), then 2.73 g sodium docedylbenzene sulfonate (DS-4) were added. The dispersion was stirred for 30 minutes, then heated to 79° C. over 75 minutes. After one hour at this temperature, aggregation of particles was observed, and the mixture was cooled. The layers were allowed to separate, and the top layer was filtered. The solid was stirred with 600 g conc. $HCl_{(aq)}$ at 85° C. for twenty hours. The mixture was cooled and filtered, and the solid washed with deionized water until wash was no longer acidic. Yield after drying was 94.3 g white beads. Particle sizes were about 2.5 to 90 microns as determined by scanning electron microscopy.

What is claimed is:

1. A polymer particle consisting essentially of an exterior water soluble polymer comprising one or more thiol functional group, and an interior polymer, wherein the interior polymer is formed from at least one water insoluble free-radical polymerizable monomer, and wherein said interior polymer is encapsulated within and bound to the exterior polymer by one or more sulfide linkages and wherein the polymer particle has a diameter within the range of from about 0.1 micron to about 200 microns.

2. A method for preparing a polymer particle having a diameter in the range of from about 0.1 micron to about 200 microns comprising forming an aqueous dispersion by encapsulating at least one water insoluble monomer and at least one free radical source, within a water soluble polymer comprising one or more thiol functional groups, said water soluble polymer being dissolved in an aqueous phase, and polymerizing the at least one water insoluble monomer within the water soluble polymer to form said polymer particle.

3. The method of claim 2 wherein the aqueous phase contains at least one hydroxyl radical source.

4. The method of claim 2 wherein encapsulating the water insoluble monomer comprises subjecting the water soluble polymer to ultrasonic irradiation.

5. The method of claim 2 wherein encapsulating the water insoluble monomer within the water soluble polymer comprises the rise of mechanical mixing.

6. The method of claim 2 wherein encapsulating the water insoluble monomer within the water soluble polymer further comprises the addition of a redox initiator system.

7. The method of claim 2 wherein the water soluble polymer is a protein.

8. The method of claim 2 wherein the at least one water insoluble monomer is selected from the group consisting of vinyl aromatic compounds, vinyl ethers, vinyl esters of a carboxylic acid and vinyl dicarboxylic acids.

9. The method of claim 2 wherein the at least one water insoluble monomer is a polyethylenically unsaturated monomer.

10. The method of claim 2 wherein the aqueous dispersion comprises a surfactant.

11. The method of claim 2 wherein a disulfide cleavage reagent is added following polymerization of the water insoluble monomer or monomers.

12. The method of claim 2 wherein the water soluble polymer is removed by acid hydrolysis from the polymer formed from the water insoluble monomer or monomers.

13. A polymer particle prepared according to the method of claim 2.

14. A polymer particle prepared according to the method of claim 2 wherein the exterior portion has been removed.

15. A polymer particle consisting essentially of:
  (i) an exterior water soluble polymer selected from the group consisting of naturally occurring proteins comprising one or more thiol functional group, acrylic polymers comprising one or more thiol functional group, and methacrylic polymers comprising one or more thiol functional group, and
  (ii) an interior polymer,
wherein the interior polymer is formed from at least one water insoluble free-radical polymerizable monomer, and wherein said interior polymer is encapsulated within and bound to the exterior polymer by one or more sulfide linkages, and wherein the polymer particle has a diameter within the range of from about 0.1 micron to about 200 microns.

* * * * *